(12) United States Patent
Barrus et al.

(10) Patent No.: US 9,134,947 B2
(45) Date of Patent: Sep. 15, 2015

(54) ANNOTATING DIGITAL FILES OF A HOST COMPUTER USING A PERIPHERAL DEVICE

(75) Inventors: John W. Barrus, Menlo Park, CA (US); Kurt W. Piersol, Campbell, CA (US); Ken F. Gudan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 770 days.

(21) Appl. No.: 12/415,863

(22) Filed: Mar. 31, 2009

(65) Prior Publication Data

US 2010/0251106 A1  Sep. 30, 2010

(51) Int. Cl.
*G06F 17/00* (2006.01)
*G06F 3/14* (2006.01)
*G06F 3/0488* (2013.01)
*G06F 17/24* (2006.01)

(52) U.S. Cl.
CPC .......... *G06F 3/1415* (2013.01); *G06F 3/04883* (2013.01); *G06F 17/242* (2013.01)

(58) Field of Classification Search
CPC .. G06F 17/242; G06F 3/04883; G06F 3/1415
USPC ........................... 715/203, 268, 246; 709/248
See application file for complete search history.

(56) References Cited

U.S. PATENT DOCUMENTS

| RE34,476 E * | 12/1993 | Norwood ..................... 382/186 |
| 6,504,956 B1 * | 1/2003 | Gannage et al. ............. 382/188 |
| 7,134,077 B2 * | 11/2006 | Sellen et al. .................. 715/268 |
| 7,224,991 B1 * | 5/2007 | Fuoss et al. ................... 455/466 |
| 8,265,382 B2 | 9/2012 | Edgecomb et al. |
| 2002/0062326 A1 | 5/2002 | Sellen et al. |
| 2002/0107885 A1 * | 8/2002 | Brooks et al. ................. 707/505 |
| 2002/0113803 A1 | 8/2002 | Samra et al. |
| 2002/0129057 A1 | 9/2002 | Spielberg |
| 2004/0163042 A1 * | 8/2004 | Altman ........................ 715/512 |
| 2004/0237033 A1 * | 11/2004 | Woolf et al. .................. 715/512 |
| 2005/0177783 A1 * | 8/2005 | Agrawala et al. ............. 715/512 |
| 2005/0262201 A1 * | 11/2005 | Rudolph et al. ............... 709/205 |
| 2007/0204047 A1 * | 8/2007 | Parker et al. .................. 709/227 |

(Continued)

FOREIGN PATENT DOCUMENTS

| JP | 2004240675 A | 8/2004 |
| JP | 2008500615 A | 1/2008 |

(Continued)

OTHER PUBLICATIONS

Gifts Steven H., Law Dictionary, 2003, Barron's Education Series, Fifth Edition, p. 481.*

(Continued)

*Primary Examiner* — Chau Nguyen
(74) *Attorney, Agent, or Firm* — Hickman Palermo Becker Bingham LLP

(57) ABSTRACT

In an embodiment, a computer-implemented method comprises receiving, at a tablet computer that is coupled to a host computer, image data representing a selected portion of an electronic document; the tablet computer displaying the same image data on a stroke-sensitive display of the tablet computer; the tablet computer receiving user input from the stroke-sensitive display and representing handwritten strokes; the tablet computer storing, in a memory of the tablet computer, a data file based at least upon the user input and the image data; transmitting the stroke data from the tablet display unit to the coupled host computer where the stroke data appears on the original image data.

21 Claims, 11 Drawing Sheets

(56) References Cited

U.S. PATENT DOCUMENTS

| | | |
|---|---|---|
| 2008/0005371 A1* | 1/2008 | Hill et al. .......................... 710/8 |
| 2008/0065996 A1* | 3/2008 | Noel et al. .................... 715/753 |
| 2008/0073427 A1* | 3/2008 | Voigt ............................ 235/380 |
| 2008/0114615 A1* | 5/2008 | Mahesh et al. .................... 705/2 |
| 2008/0235577 A1* | 9/2008 | Veluchamy et al. .......... 715/268 |
| 2008/0303794 A1* | 12/2008 | Bolt et al. .................... 345/173 |
| 2009/0096880 A1* | 4/2009 | Tanaka ..................... 348/211.14 |
| 2009/0198839 A1* | 8/2009 | Banerjee et al. ................ 710/10 |
| 2009/0292999 A1* | 11/2009 | LaBine et al. ................ 715/740 |
| 2010/0077028 A1 | 3/2010 | O'Sullivan et al. |
| 2010/0100743 A1* | 4/2010 | Ali et al. ....................... 713/176 |
| 2010/0245294 A1 | 9/2010 | Piersol et al. |

FOREIGN PATENT DOCUMENTS

| | | | |
|---|---|---|---|
| JP | 2010079215 A | 4/2010 | |
| WO | WO 2006111979 A2 * | 10/2006 | .............. G06F 19/00 |

OTHER PUBLICATIONS

U.S. Appl. No. 12/415,869, filed Mar. 31, 2009, Interview Summary, Nov. 6, 2014.

U.S. Appl. No. 12/415,869, filed Mar. 31, 2009, Office Action, Mailing Date Mar. 11, 2015.

* cited by examiner

ANNOTATING DIGITAL FILES OF A HOST COMPUTER USING A PERIPHERAL DEVICE

TECHNICAL FIELD

The disclosure relates generally to applying annotations to computer files. The disclosure relates more particularly to annotating digital files on a host computer using a peripheral device based on a selected portion of a display of the host.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Despite the widespread use of computers and information technology, some areas of commerce continue to require archaic practices, such as requirements for physical signatures. In response, some organizations, such as the United States Patent & Trademark Office, have relaxed their requirements for handwritten signatures and will accept electronic signatures comprised of typewritten (ASCII) characters. Similarly, electronic commerce is widely performed without use of handwritten signatures or other handwritten information. The Federal Rules of Evidence treat electronic signatures and handwritten signatures equivalently. Nevertheless, a physical signature remains required practice in many commercial fields. For example, real estate transactions are often documented by multiple facsimile transmissions containing handwritten signatures and text, even though legibility may be difficult and there is no convenient way to digitally store signature information.

However, in some cases handwriting and physical signatures are desirable. For example, collaborative document editing and management is sometimes better performed using handwriting rather than a keyboard.

Marking and annotating documents on a computer screen has been difficult or expensive in past practice. Digitizing tablets have been used to enable sketching on computer screens. Typically such digitizing tablets have used sophisticated pressure sensing circuits and materials, but they are not easy for ordinary people to use. Further, relatively few digitizing tablets are deployed in the field and few host computer applications (such as personal computer applications) can accept input from digitizing tablets. One manufacturer offers displays with integrated pen sensors, but these displays are very expensive and not easy to carry. Tablet computers have been offered, but for reasons of price and functionality, have not proved popular.

SUMMARY

In an embodiment, a computer-implemented method comprises receiving, at a tablet computer that is coupled to a host computer, image data representing a selected portion of an electronic document; the tablet computer displaying the same image data on a stroke-sensitive display of the tablet computer; the tablet computer receiving user input from the stroke-sensitive display and representing handwritten strokes; the tablet computer storing, in a memory of the tablet computer, a data file based at least upon the user input and the image data.

In an embodiment, the method further comprises the tablet computer detecting connection of the tablet computer to the host computer and downloading a host computer module from the tablet computer to the host computer, wherein the host computer module is configured to obtain user input selecting the electronic document, to receive one or more stroke events representing the handwritten strokes, and to update the electronic document at the host computer based on the stroke events.

In an embodiment, the method further comprises the tablet computer detecting connection of the tablet computer to the host computer and downloading a host computer module from the tablet computer to the host computer, wherein the host computer module is configured to obtain user input selecting the electronic document from among a plurality of electronic documents stored on the tablet computer, to receive one or more stroke events representing the handwritten strokes, and to update the electronic document at the tablet computer based on the stroke events.

In an embodiment, the method further comprises the host computer detecting connection of the tablet computer to the host computer, and in response, the host computer executing driver logic associated with a device type of the tablet computer, wherein the driver logic is configured to obtain user input selecting the electronic document, to receive one or more stroke events representing the handwritten strokes, and to update the electronic document at the host computer based on the stroke events.

In an embodiment, the method further comprises the tablet computer detecting connection of the tablet computer to the host computer and downloading a host computer module from the tablet computer to the host computer, wherein the host computer module is configured to obtain user input selecting the electronic document from among a plurality of electronic documents that are stored in an external storage system and referenced in a filesystem of the tablet computer, to load the electronic document from the external storage system into temporary storage of the host computer, to receive one or more stroke events representing the handwritten strokes, and to update the electronic document on the external storage system based on the stroke events.

In an embodiment, the method further comprises the tablet computer receiving the user input after the tablet computer detects disconnection of the tablet computer from the host computer.

In an embodiment, the method further comprises the tablet computer receiving and buffering the user input after the tablet computer detects disconnection of the tablet computer from the host computer; the tablet computer detecting reconnection of the tablet computer to the host computer; and the tablet computer communicating the user input to the host computer in response to detecting the reconnecting.

In an embodiment, the method further comprises receiving second user input selecting the image data representing the selected portion of the electronic document; receiving third user input representing user invocation of a peripheral annotation function; in response to receiving the third user input, invoking a logic module that is configured to communicate the region to the tablet computer.

In an embodiment, the image data represents a portion of an electronic document for a signature, and the user input represents a signature applied to the stroke-sensitive display.

In an embodiment, the image data represents a portion of an electronic document, and the user input represents one or more annotations to the electronic document.

In an embodiment, the displaying comprises displaying, on the stroke-sensitive display of the tablet computer, only the image data representing the selected portion of the electronic document, and not all of the graphical display of the host computer.

In an embodiment, the displaying comprises displaying, in all available display area of the stroke-sensitive display of the tablet computer, only the image data representing the selected portion of a graphical display.

In an embodiment, a data processing system, comprises a central processing unit; a stroke-sensitive display coupled to the central processing unit; a host computer interface coupled to the central processing unit and configured to couple to a host computer; logic coupled to the central processing unit for execution by the central processing unit and configured to cause the central processing unit to perform receiving, while coupled to a host computer, image data representing a selected portion of an electronic document; the system displaying the same image data on the stroke-sensitive display; the system receiving user input from the stroke-sensitive display and representing handwritten strokes; the system storing, in the memory, a data file based at least upon the user input and the image data.

Embodiments also encompass a novel tablet computer configured as shown and described, and a novel computer-readable storage medium storing instructions which when executed by one or more processors cause the one or more processors to perform the operations that are shown and described herein. Embodiments encompass numerous alternatives, variations, and optional steps, functions and processes as further described herein, such as in respect to FIGS. 4A, 4B, 4C, 4D. The processes are related and in one embodiment all such processes may be implemented in a single tablet computer.

In an embodiment, a computer-implemented method comprises receiving, at a tablet display unit of a first tablet that is coupled to a host computer, image data representing a selected portion of a common display file that is stored on an administrator computer; displaying the image data on a stroke-sensitive display of the tablet display unit; receiving user input from the stroke-sensitive display of the tablet display unit and representing handwritten strokes; transmitting the user input to the administrator computer; receiving, from the administrator computer, second image data representing strokes that other users have applied to the same image data using other tablets that are coupled to the administrator computer over a network; displaying, on the stroke-sensitive display, the second image data; storing, in a memory of the tablet display unit, a data file based at least upon the user input and the image data.

In an embodiment, the data file is based at least upon the user input graphically overlaid on the image data. In an embodiment, the method further comprises receiving the user input after disconnecting the tablet display unit from the host computer. In an embodiment, the method further comprises receiving the user input after disconnecting the tablet display unit from the host computer, reconnecting the tablet display unit to the host computer, and communicating the user input to the host computer after the reconnecting.

In an embodiment, the image data is maintained using a portable document format. In an embodiment, the image data represents a portion of an electronic document for a signature, and the user input represents a signature applied to the stroke-sensitive display. In an embodiment, the image data represents a portion of an electronic document, and the user input represents one or more annotations to the electronic document.

In an embodiment, the first tablet and the one or more other tablets are connected by a peer-to-peer network.

In an embodiment, the user input and the second image data are received for a pre-selected duration of time. In an embodiment, the user input includes timestamp information indicating a time the stroke data was received.

In an embodiment, a data processing system, comprises a central processing unit; a stroke-sensitive display coupled to the central processing unit; a host computer interface coupled to the central processing unit and configured to couple to a host computer; memory coupled to the central processing unit and storing a plurality of sequences of program instructions which when executed by the central processing unit cause the central processing unit to perform receiving, at the stroke-sensitive display, image data representing a selected portion of a common display file that is stored on an administrator computer; displaying the image data on the stroke-sensitive display; receiving user input from the stroke-sensitive display and representing handwritten strokes; transmitting the user input to the administrator computer; receiving, from the administrator computer, second image data representing strokes that other users have applied to the same image data using other tablets that are coupled to the administrator computer over a network; displaying, on the stroke-sensitive display, the second image data; storing, in the memory, a data file based at least upon the user input and the image data.

Embodiments also encompass novel networked tablet computers configured as shown and described, and a novel computer-readable storage medium storing instructions which when executed by one or more processors cause the one or more processors to perform the operations that are shown and described herein. Embodiments encompass numerous alternatives, variations, and optional steps, functions and processes as further described herein, such as in respect to FIGS. 4A, 4B, 4C, 4D.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1. Overview of Annotating Digital Files of a Host Computer Using a Peripheral Device with a Single User In various embodiments, the present disclosure provides techniques for annotating digital files of a host computer using a peripheral device. In one embodiment, a single user operates a tablet computer in conjunction with a host computer. In one approach, digital files of a host computer may be annotated using a tablet computer hosting an application that supports using the tablet as an input device for the application to provide stroke data to a document. In a second approach, digital files stored on the tablet computer may be annotated using the tablet computer. In a third approach, digital files on a host computer may be annotated using a tablet computer that operates as an independent device under control of a driver or other host computer application. In a fourth approach, digital files that are stored in an external storage service, rather than in the host computer or in the tablet computer, may be annotated using a tablet computer. In another embodiment, multiple users each having a different separate tablet computer may collaborate to annotate digital documents using networked processes. A particular tablet computer may implement hardware, firmware, other logic, or computer programs to provide any one, all, or a subcombination of the approaches and embodiments described herein.

Figure 1A:
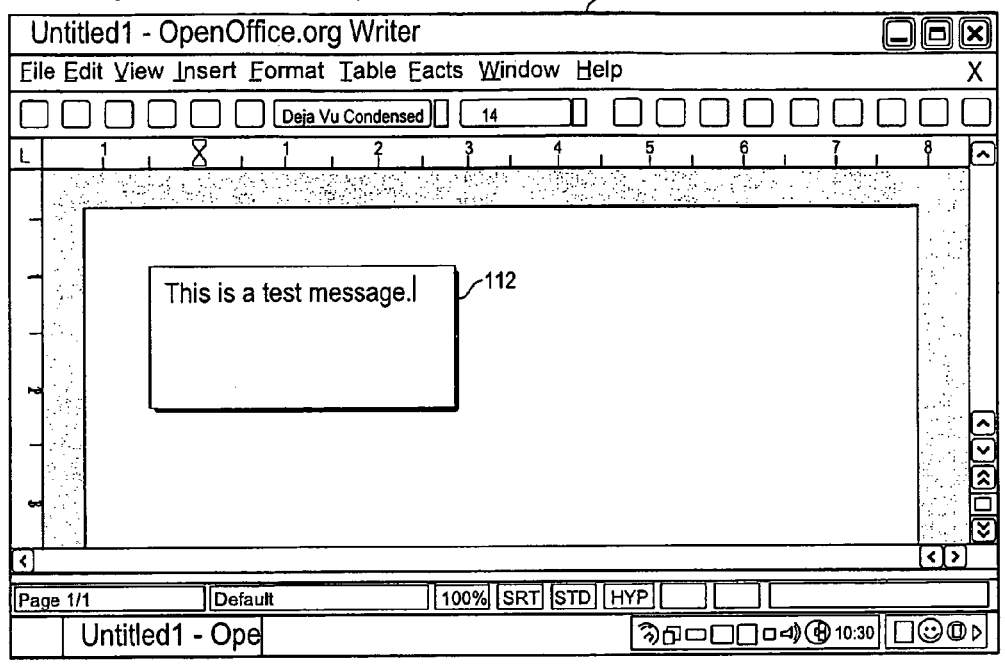
FIG. 1A illustrates a computer display of a host computer and a tablet display of a tablet computer.
Figure 1A:
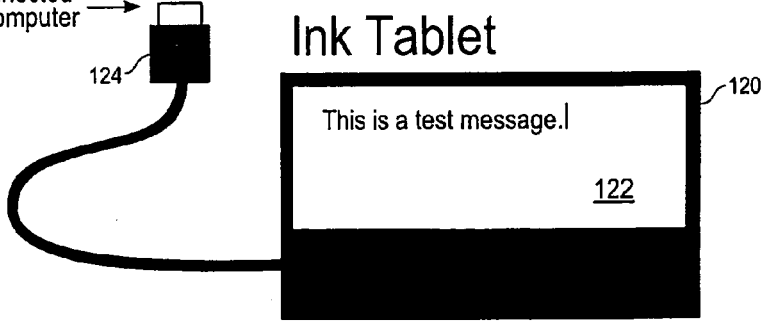
Figure 1B:
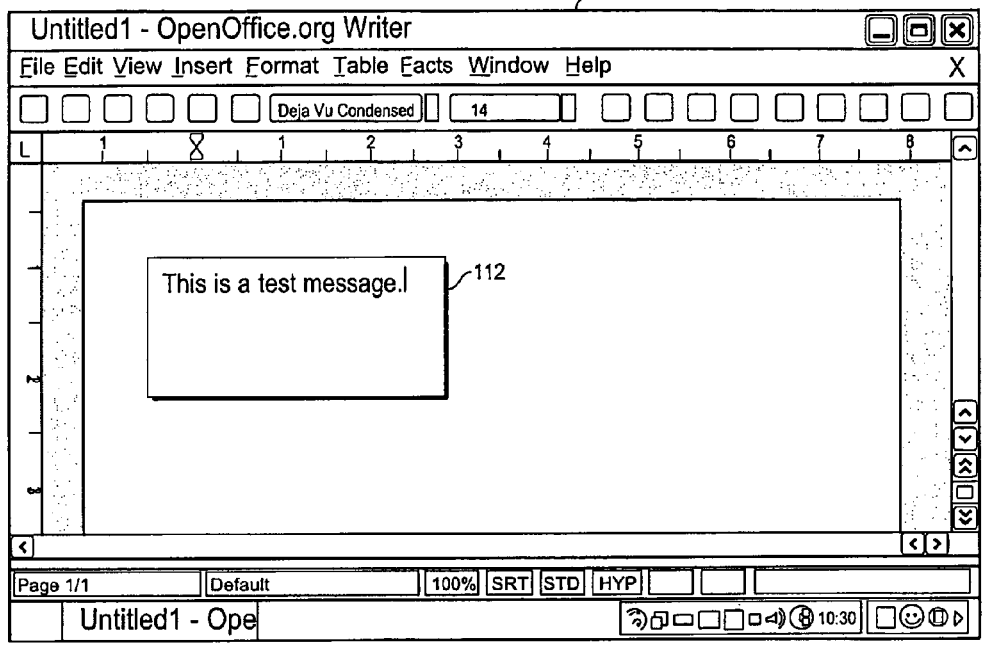
FIG. 1B illustrates the displays of FIG. 1A after a user has disconnected the tablet computer from the host computer, and placed an annotation on the tablet display.
Figure 1B:
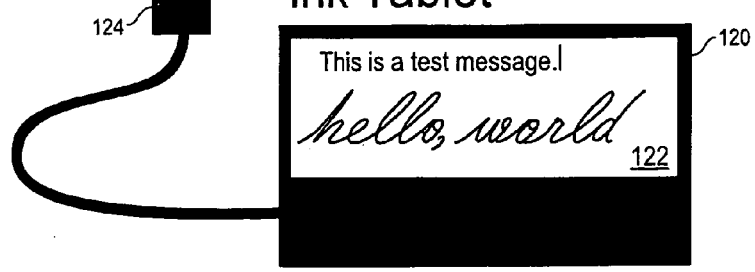
Figure 1C:
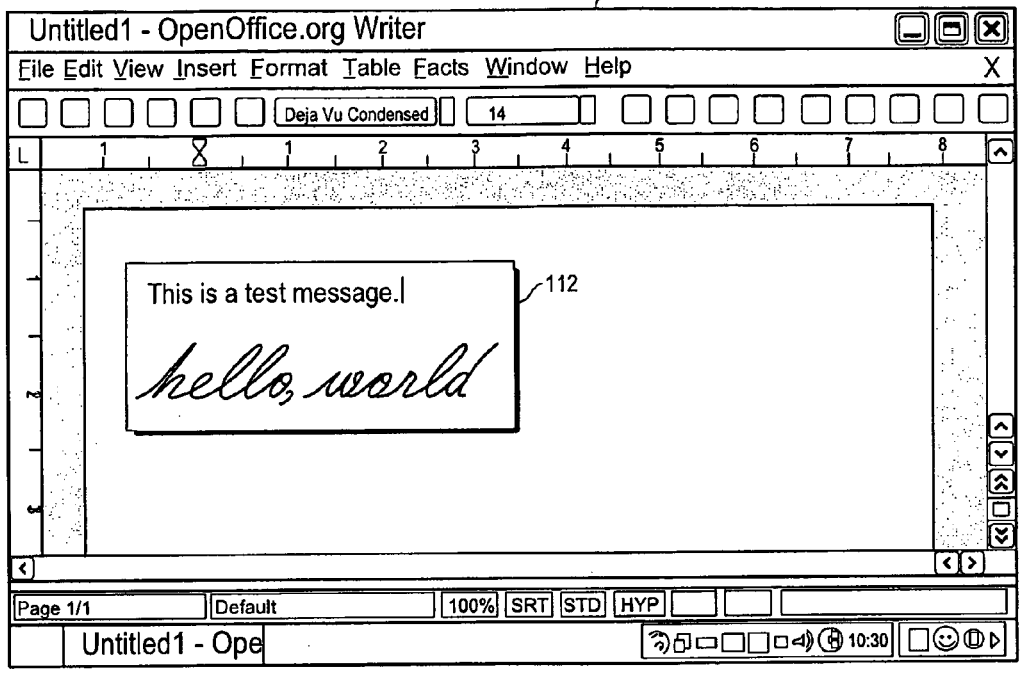
FIG. 1C illustrates the displays of FIG. 1A after the user has reconnected the tablet computer to the host computer.

Operation of an electronic marking system from a single-user perspective is illustrated first with respect to FIG. 1A, FIG. 1B, and FIG. 1C. FIG. 1A illustrates a computer display of a host computer and a tablet display of a tablet computer. FIG. 1B illustrates the displays of FIG. 1A after a user has disconnected the tablet computer from the host computer, and placed an annotation on the tablet display. FIG. 1C illustrates the displays of FIG. 1A after the user has reconnected the tablet computer to the host computer. Referring first to FIG. 1A, a system 100 comprises a computer display 110 of a host computer that is connected to a tablet 120 having a tablet display unit 122. In an embodiment, tablet 120 comprises a computer peripheral device having the internal elements described further herein in relation to FIG. 2. Alternatively, other kinds of peripheral devices may be used with the techniques herein.

In an embodiment, tablet 120 comprises a connection 124 that is configured to couple to an appropriate interface on the host computer. In an embodiment, connection 124 is a USB connection. USB provides a relatively high-speed serial interface through which images may be received from the host computer and stroke data may be communicated to the host. In an embodiment, connection 124 is made by a wireless connection, using a Bluetooth, Wi-Fi, or other transmission mechanism.

The host computer hosts an application program that causes generating and displaying a graphical user interface on the host computer. Example application programs include, but are not limited to, a word processor, spreadsheet, e-mail client, video editor, etc. For purposes of illustrating a clear example, FIG. 1A, FIG. 1B, FIG. 1C show a graphical display of "OpenOffice.org Writer," but other applications may be used in other embodiments.

In an embodiment, the application program is configured to enable a user, process or system to select a portion of the display 110. In an embodiment, portion 112 of computer display 110 denotes the selected portion.

In an embodiment, the application program is configured to communicate image data representing the selected portion 112 of computer display 110 to the tablet 120, and in response, the tablet computer reproduces the display of the portion on the tablet display unit 122. The image data representing the selected portion 112 may comprise a copy of a bitmap or other graphical image obtained from the graphical user interface of the host computer display 110. Thus, the same image data is displayed on the tablet display unit corresponding to the selected portion 112. In one embodiment, the image data may be obtained by the application program performing a call to an application programming interface of an operating system of the host computer to result in copying a portion of display memory.

In an embodiment, only portion 112 of computer display 110 is transmitted to tablet 120; alternatively, an entire file hosted at computer 110 may be communicated to the tablet, with additional information identifying the portion 112. In an embodiment, the portion 112 is displayed in a manner that occupies substantially all of the available display space of tablet display unit 122. However, in other embodiments, the portion 112 may occupy only a part of the available display space of tablet display unit 122.

In an embodiment, the tablet display unit 122 is a stroke-sensitive display that can receive and record user input in the form of handwritten strokes using a stylus or other marker or pointing device. A user may provide user input representing one or more annotations to the information shown on tablet display unit 122, causing data representing the handwritten strokes to be communicated to the host computer, or to other computers. The annotations may be applied while the tablet 120 is (1) physically coupled to the host computer, as illustrated in FIG. 1A, (2) physically uncoupled to the host computer but in communication with the host computer, for example, via a Wi-Fi connection, or (3) not connected to the host computer and not in communication with the host computer.

Referring now to FIG. 1B, any wireless or wired links between tablet 120 and the host computer have been removed (disconnected). Disconnection allows to user to operate tablet 120 wherever desired, offering the user added convenience and mobility. Memory in tablet 120 retains the selected portion 112 of computer display 110 and a processor and program logic in the tablet causes the tablet display unit 122 to continue to display the selected portion. The user may annotate tablet display unit 122 using a stylus with any markings desired. As an example, the user has written the annotation "hello, world" on the tablet display unit 122. A memory in tablet 120 stores tablet data representing all user input to the tablet.

Referring now to FIG. 1C, tablet 120 is reconnected using connection 124 to the host computer. In an embodiment, upon reconnection, instructions in the host computer and tablet 120 cause transferring the user annotations (in this example, data representing "hello, world") written upon tablet 120 and incorporate the tablet data into portion 112 of computer display 110. For example, when a USB connection is used, reconnecting the tablet using connection 124 can trigger operation of a plug-and-play driver for the connection that causes the host computer to retrieve annotations that were stored in memory of the tablet.

In an embodiment, the tablet data is also incorporated into the file that is displayed by computer display 110. The annotations may be combined with portion 112 and stored in a display file in the tablet 120 for transfer to the host computer. In this example, the phrase "hello, world" is reproduced on computer display 110 in portion 112 in the same proportions relative to proportions of the original user input that was written on tablet 120. In an embodiment, the proportion ratio can be adjusted up or down as desired using functions of the application program on the host computer.

Thus, in one approach, the techniques herein comprise receiving, at a tablet display unit that is coupled to a host computer, image data representing a selected portion of a graphical display on a computer display unit of the host computer; displaying the same image data on a stroke-sensitive display of the tablet display unit; receiving user input from the stroke-sensitive display of the tablet display unit and representing handwritten strokes; storing, in a memory of the tablet display unit, a data file based at least upon the user input and the image data. In this way, a computer peripheral device may be used to annotate information that was originally generated at a host computer. Example annotations may include signatures on electronic documents, comments on electronic documents, markings of significant portions or passages in electronic documents, modifications or comments on graphical images, drawings, or plans, etc.

In one particular embodiment, portion 112 comprises a signature block region of an electronic document such as a contract, proposal, letter, or legal document. Tablet 120 displays only the signature block in the tablet display unit 122. A user can sign the electronic document by writing a signature on the stroke-sensitive tablet display unit using a stylus or pen. The signature is communicated back to the host computer and forms part of the electronic document at the host computer.

Using this approach, an inexpensive peripheral device can be used to facilitate signatures and annotations with far more ease and convenience than prior approaches. In particular, reproducing portion 112 on the tablet display unit 122 provides context for the signature of the user. The user is not required to look back and forth between the tablet display unit 122 and the computer display 110 in an attempt to orient the stylus in the right location to sign the electronic document. Instead, reproducing the portion 112 on the tablet display unit 122 enables the user to see the location to be signed or annotated on the peripheral on which the signing or annotating is performed. Further, in an embodiment, the portion 112 as shown in the tablet display unit 122 is a reproduction of a bitmap graphic image of the computer display 110, so that the appearance of the tablet display unit is substantially similar to a portion of the computer display. This approach improves the orientation and comprehension of the user and provides a clear connection between what is being annotated or signed and what is displayed on the host computer.

Figure 2:
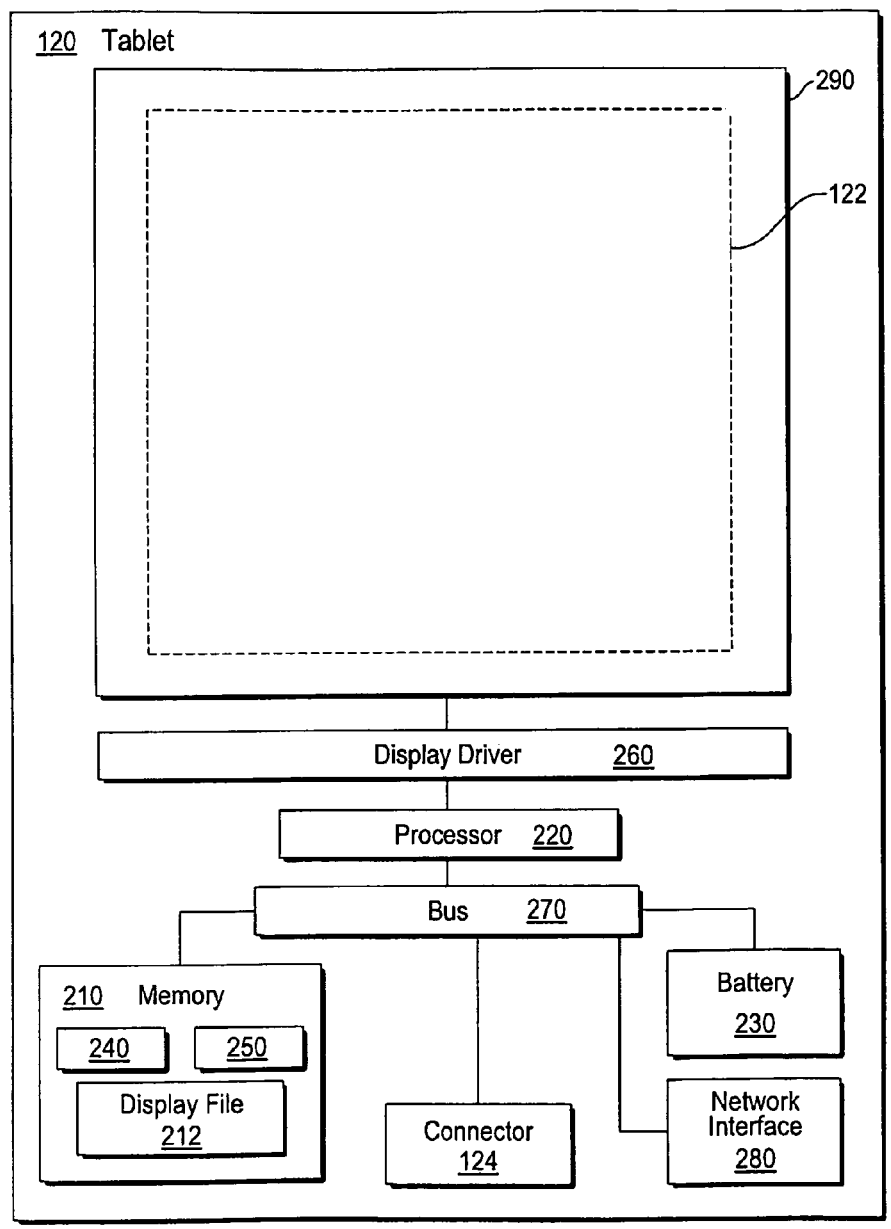
FIG. 2 illustrates a tablet computer.
Figure 3:
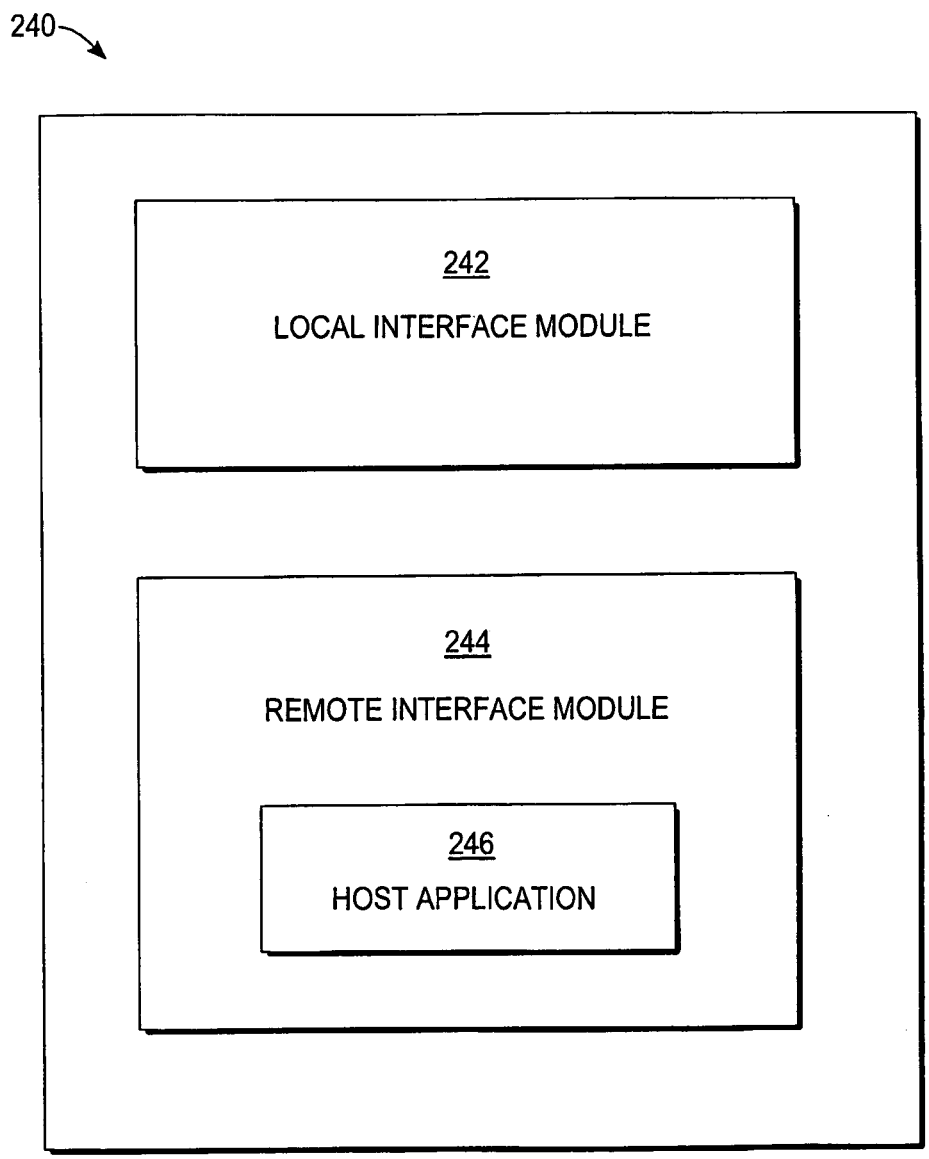
FIG. 3 illustrates logic modules of the tablet computer.

2. Example Structural and Functional Overview of Tablet 2.1 Example Tablet Computer Arrangement An example structural overview and functional overview of an embodiment of tablet 120 is now further described with reference to FIG. 2, FIG. 3, and FIGS. 4A, 4B, 4C, 4D. FIG. 2 illustrates a tablet computer. FIG. 3 illustrates logic modules of the tablet computer. FIGS. 4A, 4B, 4C, 4D illustrate various processes of annotating digital files of a host computer using a tablet computer.

Referring first to FIG. 2, in an embodiment, tablet 120 comprises a tablet display unit 122 communicatively coupled to a processor 220 through a display driver 260. The processor 220 is further coupled to a memory 210 and battery 230, which may include a charging circuit, using bus 270. Processor 220 may be coupled to a network interface 280, such as an Ethernet interface configured to couple to a router, modem, local area network (LAN) equipment, wireless network or lines.

In an embodiment, tablet 120 omits high-performance non-volatile storage such as disk storage, omits a high-performance processor, display or graphics processor, and has a single serial interface and optionally a network interface. The tablet 120 may comprise a computer peripheral device that combines a relatively small display and an input device, featuring a stroke-sensitive graphical display, stylus, microcontroller, and NVRAM storage. The device allows an application program to store images to the device for display, and then sends strokes back to the application program when marks are made on its surface.

In an embodiment, tablet display unit 122 is an electronic ink display. In an embodiment, tablet display unit 122 is an electrophoretic display, such as VIZPLEX imaging film, manufactured by E*Ink Corporation layered with a backplane from Prime View International.

In an embodiment, touch input sensor 290 is configured on tablet display unit 122, and touch input sensor 290 may cover an area larger than the area of the tablet display unit 122. In an embodiment, touch input sensor 290 is a Wacom sensor or touch panel.

In an embodiment, tablet display unit 122 is a combination of a stroke-sensitive display such as an electronic ink display with a touch-sensitive layer. In an embodiment, tablet display unit 122 is an electrophoretic display capable of accepting pen-based input, such as VIZPLEX imaging film, manufactured by E*Ink Corporation, combined with a resistive or RF touch panel layered above or below the display.

Memory 210 contains storage for executable instructions 240 and user input data 250. In an embodiment, memory 210 comprises non-volatile memory, such as flash memory. Executable instructions 240, the operation of which is further described below with respect to FIG. 3 and FIG. 4, include instructions for an annotation application that accepts and displays user input, and instructions for communicating with a computer connected through connection 124. Thus, the tablet 120 may store all the applications for annotation, signature or editing, and documents to be annotated, signed or edited using handwritten strokes on the tablet display unit.

Processor 220 processes executable instructions 240 and user input data 250, and additionally processes instructions and/or data that may reside on processor 220. In an embodiment, processor 220 is a microcontroller, such as a PXA270 XScale processor, manufactured by Marvell Corporation.

In an embodiment, electrical power for tablet display unit 122, processor 220, and memory 210 is supplied through the connection 124 while the connection is connected to a host computer. For example, the power capabilities of a USB interface may be used to provide power to the tablet 120.

In an embodiment, tablet 120 optionally includes a battery 230 for providing power to active elements of the tablet. In an embodiment, power for recharging the battery 230 is supplied using the connection 124.

Referring now to FIG. 3, executable instructions 240 may comprise a plurality of software modules. In an embodiment, executable instructions 240 include a local interface module 242 and a remote interface module 244. Local interface module 242 comprises instructions for presenting a user interface on tablet display unit 122, in which the user interface accepts and displays input supplied with a stylus, pen, or through touch. Remote interface 244 comprises instructions for communicating with a host computer.

In an embodiment, remote interface 244 is configured to provide a host application 246 to the host computer. Host application 246 permits viewing on the computer display of a display file, and further permits the user to select a graphical region appearing on the computer display that represents a visual portion of the display file viewed on the computer display. In an embodiment, host application 246 comprises a portable document file (PDF) viewer. In an embodiment, host application 246 is written in the JAVA programming language. In an embodiment, host application 246 is written as an Ajax web application. In an embodiment, host application 246 is written as an Adobe Air application. In various embodiments, connecting tablet 120 to the host computer using the connection 124 triggers the tablet to transfer the host application 246 to the host computer for execution at the host.

In an embodiment, display file 212 resides in memory 210 of tablet 120. In an embodiment, the display file resides on the host computer. In an embodiment, the display file resides on a network accessible to either tablet 120 or the computer.

In another embodiment, tablet 120 comprises digital electronic logic in the form of firmware, one or more application-specific integrated circuits (ASICs), field programmable gate arrays (FPGAs), other logic gates, or a combination thereof to implement the functions that are described herein for executable instructions and the modules and applications shown in FIG. 2, FIG. 3. Thus, there is no requirement to implement the instructions, modules and applications purely in software.

2.2 Operations Using an Application of the Tablet Computer

Figure 4A:
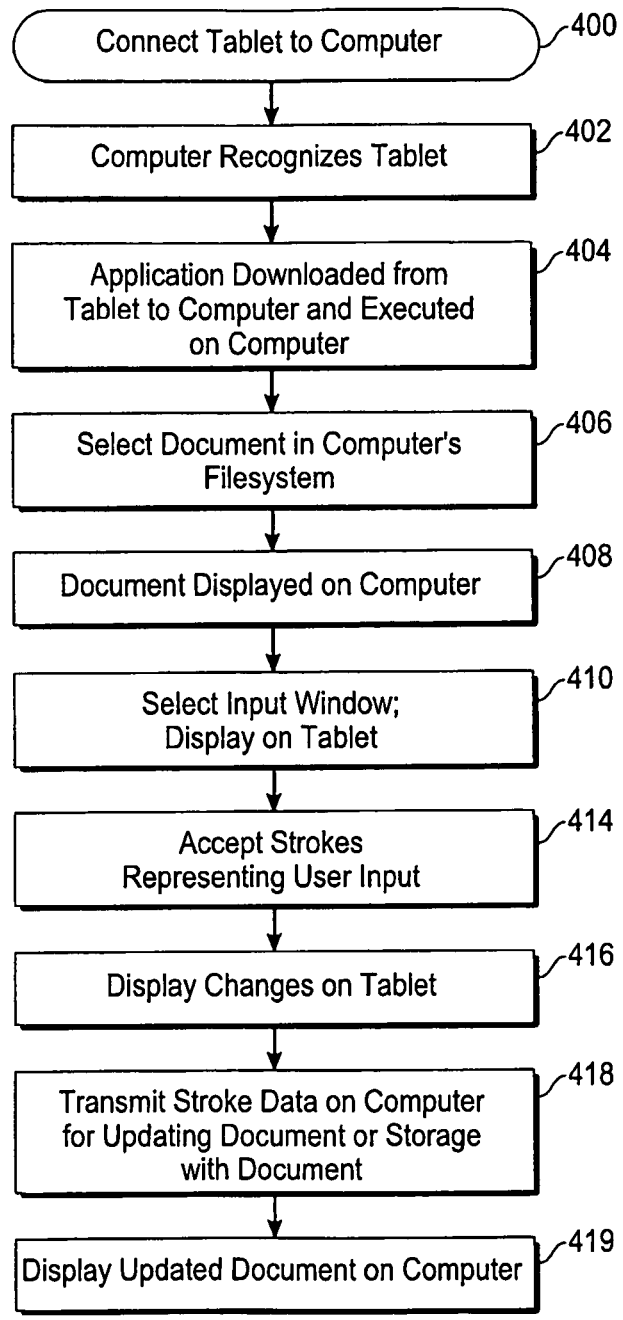
FIG. 4A illustrates a process of annotating digital files of a host computer using a tablet computer hosting an application that supports using the tablet as an input device for the application to provide stroke data to a document.

Tablet computers as shown in FIG. 2, FIG. 3 may comprise logic configured to cause the tablet computer to operate according to one or more of the processes described herein with reference to FIG. 4A, FIG. 4B, FIG. 4C, and FIG. 4D. FIG. 4A illustrates a process of annotating digital files of a host computer using a tablet computer hosting an application that supports using the tablet as an input device for the application to provide stroke data to a document. In the example of operation of tablet 120 of FIG. 4A, activation of the tablet at step 400 occurs when a connection between the tablet and the host computer is established. At step 402, the host computer recognizes tablet 120. In an embodiment, USB plug-and-play recognition techniques are used and the computer recognizes tablet 120 as a USB Mass Storage Device. In an embodiment, the host computer recognizes tablet 120 as a WebDAV server.

At step 404, host application 246 is downloaded from the tablet 120 and initiated or executed on the host computer. At step 406, a document is selected from a file system of the host computer. For example, host application 246 executing in the host computer initiates a file open dialog by calling an appropriate operating system application programming interface (API) call. As a result, a file folder, directory or list is displayed on computer display 110. In an embodiment, the contents of the folder, directory or list may be displayed on the tablet 120 using display 122.

The host application 246 accepts user input identifying a file stored in the host computer, or in networked storage that is attached to or mounted on the host computer. In response to receiving user input that identifies a particular file, the selected file is displayed on computer display 110 at step 408.

At step 410, a window for user input is displayed on computer display 110. The window represents a portion or region of the currently displayed document within which the user is permitted to enter stroke data or annotations using the tablet 120. In an embodiment, the size and position of the window is automatically selected by host application 246. Optionally, the host application 246 may call an operating system API call to highlight or identify the window on the computer display 110 using a colored rectangle, other polygon, highlighting, graying out, a pop-up window, or other display techniques.

As part of step 410, image data representing the selected region of the computer display 110 is communicated to the tablet 120 from the host computer using an image data transfer protocol. In an embodiment, image data is transmitted using Picture Transfer Protocol (PTP) as defined in standard 15740 of the International Standards Organization (ISO). In the embodiment of FIG. 4A, the host application 246 automatically communicates a bitmap of the selected region to the tablet.

At step 414, the tablet 120 accepts one or more strokes representing user input for the document. User input representing handwritten strokes of one or more signatures, annotations, or other information may be accepted by tablet 120. Data representing strokes may be captured by the logical elements of tablet 120 and temporarily stored in local memory. Concurrently, under control of the CPU of the tablet 120, display 122 displays the resulting changes made by the user at step 416.

In an embodiment, when a user writes on the tablet, the tablet displays the strokes at step 416 and concurrently sends stroke data to the host application 246 at step 418 for use in updating the document or for storage in association with the document. The stroke data may be sent as a stream of event data, such as USB user interface (UI) events that are transferred according to USB Human Interface Device (HID) protocol. As a result, the host application 246 at the host computer can capture stroke data for integration or annotation into a document.

In an embodiment, changes to the file are saved in response to a command of the user. In an embodiment, changes are automatically saved at a periodic interval, and the value of the interval is selected by host application 246 or selected by the user. In an embodiment, the user may issue a print command to print all or portions of the display file, as a regular print job or as a PDF file, for example.

In an embodiment, tablet 120 is configured with logic to process connection and disconnection events asynchronously with respect to the process of FIG. 4A. For example, during any step in the process of FIG. 4A, a user might disconnect the tablet 120 from the host computer, or might re-connect the tablet after a previous disconnect action. Tablet 120 may receive a disconnect command or signal using any of several peripheral device protocols. For example, in a USB implementation, a tablet disconnect command may be generated internally automatically in response to a user separating a USB connection of the tablet to the host computer. Functions, behavior or operations of tablet 120 in response to a disconnect event may vary depending upon the state of the tablet or the step in the process of FIG. 4A at which the disconnect event occurs. For example, in one embodiment, in response to a disconnect event after step 410 the tablet 120 may continue to perform step 414, 416, but suspend transmission of stroke data at step 418 or buffer the stroke data that is intended to be transmitted.

Similarly, a reconnection event may occur at any time and the tablet 120 may be configured to respond to reconnection in different ways depending on internal state. For example, the tablet 120 may be configured to determine whether local state data indicates whether the host application 246 has been downloaded to the host computer, and if not, to initiate operation at step 404. The tablet 120 may be configured to check whether the stroke data buffer is empty and to transmit all buffered stroke data to the host computer in response to a reconnection event. Thus, in an embodiment, once disconnected from the host computer, control for tablet 120 returns to step 414, and the user may then provide offline input that is later transmitted at step 418 upon reconnection. This option provides the user the ability to prepare a display file with a portion displayed on tablet 120, and deliver the tablet at a later time and at any location, for a person to view the display file and add an annotation to the display file.

In an embodiment, after reconnection and after step 418 is performed, at step 419 the updated document is displayed on the host computer.

Responding to a disconnect event also may include switching a power source of the tablet 120 to the internal battery.

2.3 Operations Using a Document Stored on the Tablet Computer

Figure 4B:
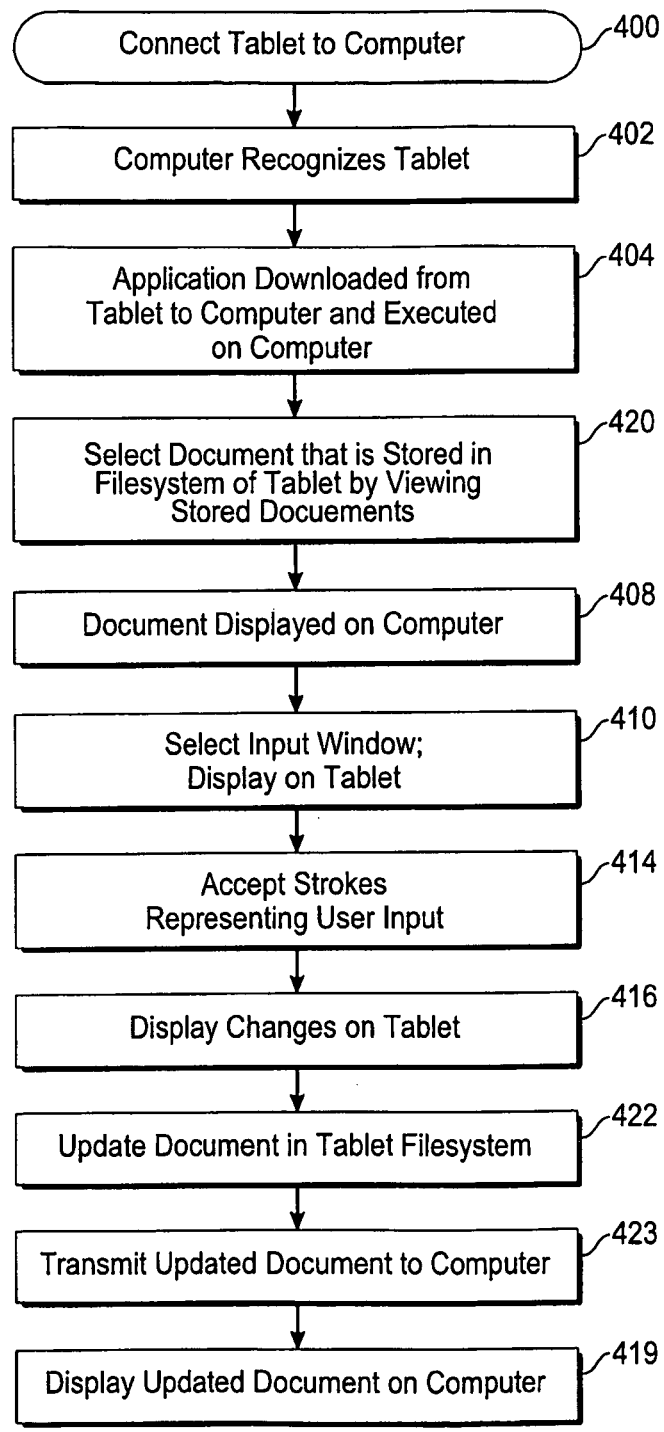
FIG. 4B illustrates a process of annotating digital files in which the document is stored on the tablet computer.

FIG. 4B illustrates a process of annotating digital files in which the document is stored on the tablet computer, rather than on the host computer. In this embodiment, steps 400, 402, 404 may be performed as described above for FIG. 4A and thereafter control passes to step 420. Alternatively, the tablet 120 may be configured with logic that can detect that the tablet 120 has been powered up but is not connected to the host computer, and to initiate operation at step 420.

Step 420 comprises selecting a document that is stored in a filesystem of the tablet 120. For example, tablet 120 may comprise logic configured to manage a file storage system within NVRAM or other storage in the tablet. The logic may be configured to display a file open dialog, list, or other user interaction mechanism for displaying available files in the filesystem and receiving user input that selects a particular file. As a result, a user selects and the tablet 120 identifies a particular document or file, stored in the filesystem within the tablet, for signature or annotation using stroke data.

At step 408, if the tablet 120 is connected to the host computer, the selected document is transferred from the tablet to the host computer and displayed on the host computer. Steps 410, 414, 416 are performed as described above for FIG. 4A, resulting in creating and locally storing stroke data representing user input of a signature, annotation, or other information.

Thereafter at step 422 the document is updated in the tablet filesystem using the stroke data. For example, stroke data or stroke events may be stored in metadata in association with a file so that later retrieval of the same file results in interpreting the metadata and displaying corresponding strokes, annotations or other information in display 122 of the tablet 120. For example, if the file is a text document or word processor document, stroke data may be converted into a signature image that is stored within a graphical box in the document, or in metadata associated with the document. Alternatively, the stroke data may be stored directly within the annotated file; for example, if the annotated file is stored in graphical bitmap format, then user input of strokes may be used to directly modify the bitmapped data, resulting in storing a new bitmap file that incorporates the strokes.

After step 422 is performed, at step 423 the updated document is transmitted to the host computer. In an embodiment, after step 423 is performed, at step 419 the updated document is displayed on the host computer.

In an embodiment, content-based identifiers (CBIs) are used to associate stroke data with document content. As a CBI is a unique traceable identification code for a document, the CBI of the original document could be transferred with the document, and used by tablet 120 as a "keycode" to ensure synchronization with the correct document. For example, if the host document were modified while tablet 120 was offline, an attempted synchronization would reveal a disparity between the document versions. A CBI may be based on a cryptographic hash such as an MD5 hash or SHA-1 hash computed over a file based on the contents of the file, and may serve as a unique identifier for a file, analogous to a file name.

In an embodiment, tablet 120 may comprise logic implementing a USB storage device protocol. In this embodiment, tablet 120 can accept an original file as well as the display image. Metadata in the original file enables logic in the tablet 120 to determine which part of the original document it is displaying, allowing the tablet to carry a document for signature or annotation to another computer. In an embodiment, tablet 120 carries both a document and an editor application, so that both are available for use on any host computer.

2.4 Annotating a Document Using the Tablet Computer as an Independent Device

Figure 4C:
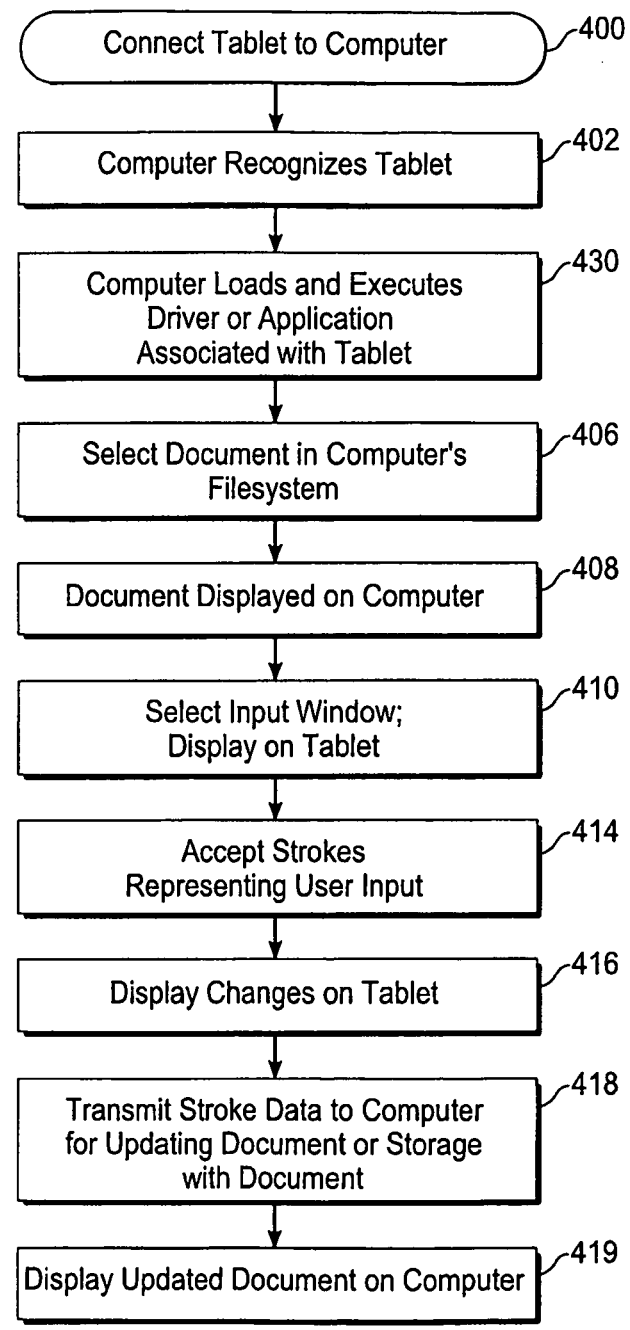
FIG. 4C illustrates a process of annotating digital files on a host computer in which a tablet computer operates as an independent device under control of a driver or other host computer application.

FIG. 4C illustrates a process of annotating digital files on a host computer in which a tablet computer operates as an independent device under control of a driver or other host computer application. The process of FIG. 4C initiates at step 400 and continues at step 402 as described above for FIG. 4A. Thereafter at step 430 the host computer automatically loads and executes a driver or other application, or initiates operation of peripheral device operating logic other than a driver or other application program, in response to recognizing the tablet 120. In an embodiment, connecting the tablet 120 to the host computer may cause the host computer to launch an editing and annotation application of the host computer in response. In one embodiment, tablet 120 is configured as a USB peripheral device, and connecting the tablet to a USB port of the host computer results in the host computer executing a driver that has been previously associated with the device type of the tablet. The driver may comprise, or may launch, an editing and annotation application.

Alternatively, printing a document from the host computer to a specified printer driver, associated with the tablet 120, may cause the host computer to transfer data to the tablet and to instruct the tablet about the contents of a document to be worked on. In an embodiment, opening an editing application on the host computer may automatically transfer the current document to a tablet 120 that is connected to the host.

Next at step 406 a document stored in the filesystem of the host computer is selected, as described above for FIG. 4A. Step 408 is also performed as described for FIG. 4A.

At step 410, the application or a user selects an input window within the selected document, and the input window is displayed on the tablet 120. In an embodiment, the application program of the host computer that is launched at step 430 inherently includes a facility that enables a user to select a portion of a graphical user interface display for annotation. In an embodiment, the user then sizes and positions this window as desired. For example, the application program may provide a selection tool that enables a user to select a rectangular region of the display of the application program by dragging a pointing device such as a mouse or trackball. Thus, the host application permits a user to specify a screen region for annotation, and might provide a resizable and positionable rectangle on the host computer screen.

The selected window is transferred to the tablet 120 as part of step 410. In an embodiment, in response to a selection signal, such as clicking a mouse button, the host computer application or logic communicates a bitmap of the selected region from the host computer to the tablet. A signal to transfer image data also may comprise moving the rectangle, or altering content of the document shown on the host computer screen.

Thereafter, steps 414, 416, 418, 419 are performed as described above for FIG. 4A. As a result, the tablet 120 may operate as an independent peripheral device under host computer control to provide stroke data representing a signature, annotation or other information for a document that is stored on the host computer.

Figure 4D:
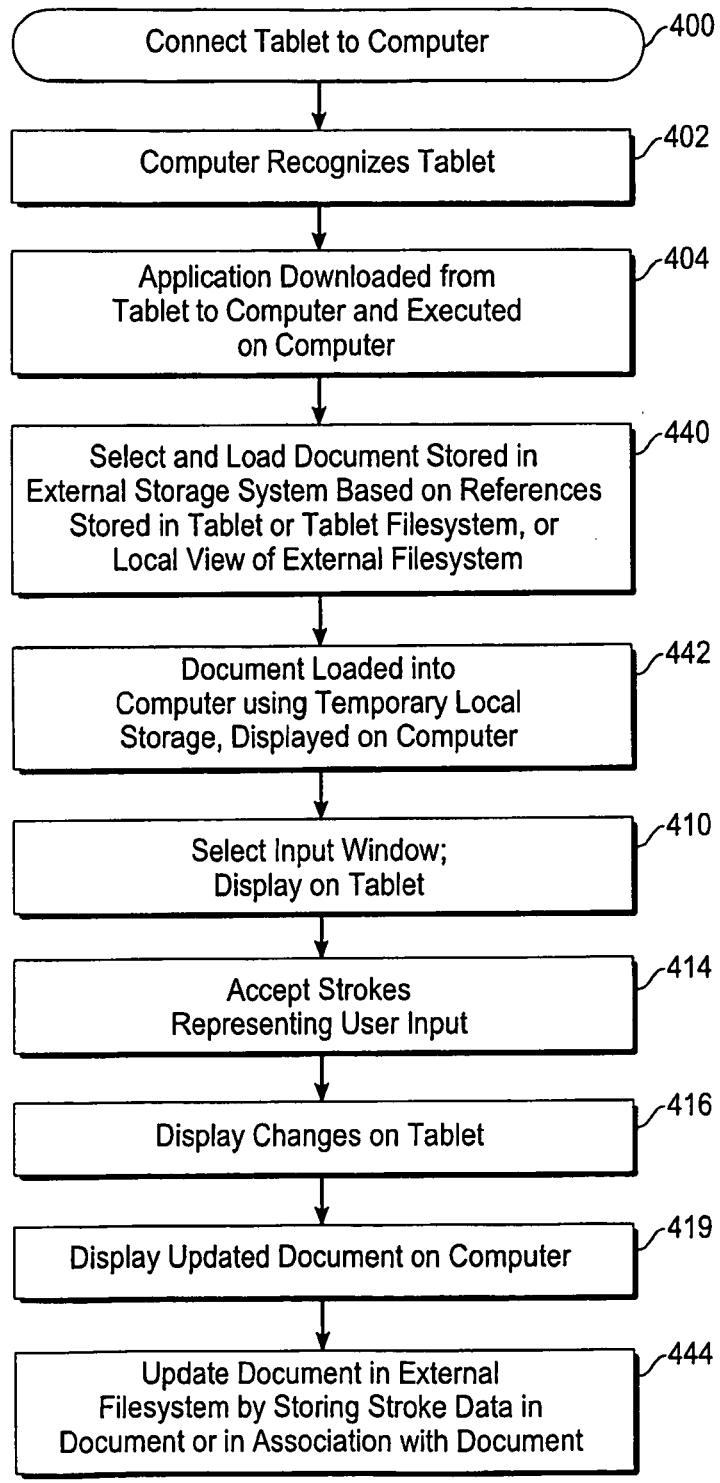
FIG. 4D illustrates a process of annotating digital files that are stored in an external storage service rather than in the host computer or tablet computer.

2.5 Annotating a Document Stored in an External File Service and Referenced on the Tablet Computer FIG. 4D illustrates a process of annotating digital files that are stored in an external storage service rather than in the host computer or tablet computer. In the embodiment of FIG. 4D, steps 400, 402, 404 proceed as described above for FIG. 4A. Thereafter at step 440 the process is configured to select and load a document that is stored in an external storage system, based on references stored in the tablet or in a filesystem of the tablet, or based on a local view of an external filesystem. For example, the tablet 120 may be connected to a host computer, but the file to be annotated may be stored in network attached storage (NAS), a storage area network (SAN) storage unit, a content-based network (CBN), or other external storage. A filesystem of the tablet 120 stores references to external files. For example, pointers or content-based identifiers (CBIs) may be locally stored in the tablet filesystem and used to reference files that are actually stored in remote storage.

The tablet 120 comprises logic that is configured to provide a file open dialog or other mechanism for displaying a folder, directory, or list of file references to a user, and to receive user input selecting one of the file references. The local filesystem may store a name of each file in association with a file reference and other metadata such as creation date, permissions, size, and file type, any one or more of which may be displayed to the user in the file open dialog. The logic may be configured to prompt a user to select a file reference and to detect and validate user input representing a file selection.

In step 442, in response to receiving user input selecting a file, the selected document or file is loaded into the host computer using temporary local storage and displayed on the computer display. File retrieval may be based on the CBI, or the tablet 120 may comprise logic that implements APIs or other processing for NAS, SAN, or other external storage systems so that the tablet can form and transmit one or more protocol-specific requests, such as file open or file lock requests, for the external storage systems.

In a variation, step 442 may comprise retrieving the external file or document and storing the file or document in local storage of the tablet 120 rather than on the host computer.

After step 442, steps 410, 414, 416 proceed as described above for FIG. 4A.

After step 416, at step 419, the updated document is displayed on the host computer.

After step 419, at step 444, the document is updated in the external filesystem by storing stroke data in the document or in association with the document. For example, the tablet 120 may pass a CBI or other file reference to the host computer, which the host computer then uses to store an updated copy of the document with stroke data, signatures, annotations or other information in the external storage system. Alternatively, the document may be updated in the tablet 120 and communicated from the tablet to the external storage system in updated form, or the tablet may communicate metadata comprising the stroke data, signatures, annotations or other information to the external storage system.

3. Overview of Annotating Digital Files of a Host Computer Using Multiple Networked Tablets

3.1 General Overview

Further benefits can be achieved when multiple tablets are connected using a network and share a common display file. Once configured, a set of multiple-user networked tablets permit users to view and sign the common display file. For example, a seller in Los Angeles can sign a sales agreement using a display tablet at or near the same time that a buyer in New York signs the same sales agreement using a display tablet. The sales agreement could be provided by a third party, such as a lender in Boston, who places the original sales agreement on a secure website, the secure website accessed by seller, buyer, and lender using a password.

In an embodiment, a multi-user transaction may be completed as follows. When all users have annotated a common display file and have indicated that it is acceptable as a final version, as further described below, the common display file is considered a completed display file. In a multiple user transaction, each networked tablet that is capable of, or required to, annotate the display file is considered a client. Management of the transaction is performed by an administrator. In an embodiment, a client may also be the administrator; thus management may be performed using a networked tablet.

In an embodiment, each networked tablet includes executable instructions 240 configured to cause the networked tablet to function as a client that can view and annotate a common display file sent to the networked tablet. In an embodiment, executable instructions 240 also include instructions configured to cause the client to perform one or more of: (a) saving, sending, or printing one or more versions of the common display file; (b) saving, sending, or printing the completed display file.

In an embodiment, operations such as saving, sending, and printing each may be performed locally with respect to a networked tablet or performed remotely over the network. For example, if authorized by the administrator, a client may save an annotated common display file to storage that is locally connected to the network tablet. For example, the annotated common display file may be stored to a USB flash memory device with administrator authorization. Similarly, with authorization from the administrator, the client may print the annotated common display file using a network printer that is coupled to a local area network in which the tablet participates.

In an embodiment discussed further below, a networked tablet may be configured to act as administrator and manage the transaction among the clients.

In structural configuration, the arrangement of FIG. 2 may be used for a networked tablet 120, with certain optional modifications as now described. In an embodiment, for ease of portability, network interface 280 may comprise a wireless interface. In an embodiment, network interface 280 comprises a wireless interface that conforms to a wireless protocol standard such as IEEE 802.11 (Wi-Fi) or a variant thereof. In an embodiment, network interface 280 is configured to communicate using the Bluetooth protocol.

In an embodiment, a networked tablet may comprise a battery 230 configured to provide electrical power to operate all components of the networked tablet. In an embodiment, networked tablet includes an external power connection configured to connect to an external power source, such as 120/220V alternating current. Alternatively, the external power connection may be configured for a low-power DC input such as 12 VDC from an external power adapter, or 5 VDC from a USB serial bus connection. In an embodiment, recharging of battery 230 is provided using power supplied using the external power connection.

In an embodiment, the networked tablet may be configured as a standalone computing device that operates independent of any local computing device. Executable instructions 240 contained in memory 210 of the networked may include networking instructions permitting the networked tablet to act either as client or administrator, or both. Operation and features of the networking instructions will be described below with respect to an example network configuration.

3.2 Example Network Configuration: Central Repository at a Server

Figure 5:
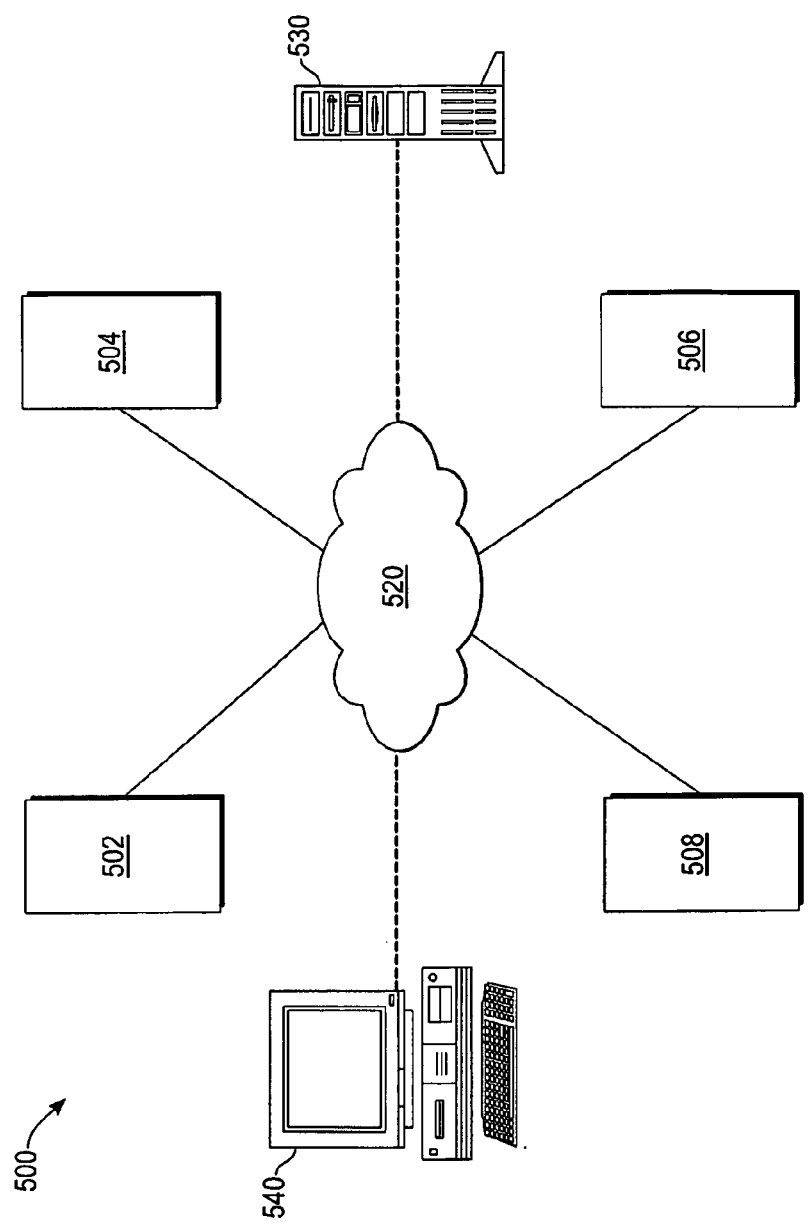
FIG. 5 illustrates a set of networked tablets connected in a network.

FIG. 5 illustrates a set of networked tablets connected in a network. Configuration 500 includes networked tablets 502, 504, 506, 508 coupled using a network 520. For purposes of illustrating a clear example, four (4) networked tablets 502, 504, 506, 508 are shown, but other embodiments may use any number of networked tablets.

In an embodiment, an optional server 530 is coupled to networked tablets 502, 504, 506, 508, and the server comprises a storage repository for the common display file. In an embodiment, the common display file is maintained on server 530 using an electronic record authentication product. For example, the ABSOLUTEPROOF product of Surety, LLC and available at the "surety.com" website may be used.

In an embodiment, an optional administrator 540 is also connected to the network 520 and acts as the administrator of transactions involving networked tablets. In an embodiment, one of networked tablets 502, 504, 506, 508 is the administrator. In an embodiment, server 530 is the administrator.

In an embodiment, each networked tablet is initialized and authenticated by server 530 in response to the networked tablet joining the network or joining a group or domain with which documents will be processed. The particular techniques used for a networked tablet to join a network or group, initialize or authenticate are not critical and any of several known group authentication and membership mechanisms may be used. In an embodiment, each networked tablet loads a temporary display file that is retrieved from server 530. For example, the temporary display file could be a finalized contract in PDF format to be signed by the users of each networked tablets 502, 504, 506, 508. As another example, the temporary display file could be a version of a contract in a word-processing format, to be edited in its native format by one or more users, prior to or during the exchange of annotations made by the users. In other embodiments, the temporary display file comprises any other set of data suitable for signing, viewing or annotation by a plurality of users of tablets.

As an example, assume that a transaction involves a seller in Los Angeles, a buyer in New York, and a lender in Boston. Referring again to FIG. 5, assume that the seller in Los Angeles operates networked tablet 502, the buyer in New York operates networked tablet 504, and the lender in Boston acts as administrator 540. Further assume that administrator 540 controls a sales contract file residing on server 530 that is to serve as an agreement between the buyer and seller. In embodiments, administrator 540 and server 530 may occupy the same physical location; however, such co-location is not necessary. A copy of the sales contract file in its original form serves as the temporary display file sent to the clients. A copy of the sales contract file in its original form is maintained on server 530 as the common display file.

Networked tablets 502, 504 each load the temporary display file. In an embodiment, once a client networked tablet loads the temporary display file, the client networked tablet sends an acknowledgment back to the administrator and awaits notification from the administrator that annotations may be supplied using the tablet display unit 122 or touch input sensor 290.

Annotations made on each of networked tablets 502, 504 by the seller in Los Angeles and the buyer in New York are captured as stroke data locally at each of the networked tablets respectively. In an embodiment, the stroke data includes the individual lines that make up the strokes, their corresponding positions on the displayed page or portion, and the identity of the displayed page. In an embodiment, the stroke data includes a time value corresponding to a time at which the tablet captured or received the stroke data. In an embodiment, the sample capture rate may be adjusted; for example, a rate of 20 samples per second may be used while a pen is in contact with tablet display unit 122 or the pen is used to provide input to touch input sensor 290.

Each tablet 502, 504 separately sends stroke data over network 520 to server 530, which incorporates the stroke data into the common display file. As the common display file is updated, it is retransmitted to the tablets 502, 504 to function as a temporary display file for each networked tablets. Thus, the buyer in New York and the seller in Los Angeles may annotate their displays and view the annotations made in near-real time, nearly simultaneously.

The manner in which an actual transaction is completed has many variations accommodated by suitable agreement of the users, and can be incorporated in various embodiments. For example, in an embodiment, completion is determined by the administrator, and after completion no client may add further annotations to the then-existing common display file on server 530. In this approach, upon completion, the common display file at the time of completion becomes an authoritative completed display file that memorializes the transaction.

Similarly, in an embodiment, completion may occur a preset time applicable to all client networked tablets, in order to prevent one user from attempting to modify the common display file after another user has indicated the transaction is completed. To facilitate this approach, the networked tablets may implement a clock synchronization protocol, such as Network Time Protocol (NTP). In an embodiment, completion may comprise a two-step process in which each client first activates a Stop command to signify the client's termination of input, and after all clients have activated the Stop command, all clients then activate an Accept command to generate the completed display file. Such a process would permit each user to fully review the common display file prior to indicating acceptance.

In an embodiment, timestamp information is stored in the common display file with the stroke data, providing an annotation history timeline on the completed display file. In an embodiment, one or more networked tablets are unable to print or save a common display file, but print or save functions may be permitted for the completed display file.

3.3 Example Network Configuration: Peer-To-Peer

In the example presented above, a network 520 of tablets uses server 530 as an authoritative, centralized storage point. Alternatively, other configurations may be used to create a completed display file acceptable to all participants. For example, the set of clients and the administrator may form one of a number of types of peer-to-peer networks, in which stroke data from a client is passed through the peer-to-peer network to all other clients and the administrator. A networked tablet may be both a client and the administrator in the peer-to-peer network. In an embodiment, the peer-to-peer network is configured using Voice over IP (VoIP) clients with networked tablets configurable as both ordinary hosts and supernodes. In an embodiment, the Skype peer-to-peer protocol, or a variant thereof, is used. In an embodiment, the peer-to-peer network is configured using the T.120 Multipoint Data Conferencing and Real Time Communication Protocols or a variant thereof. Alternatively, the BitTorrent peer-to-peer protocol could be used.

In an embodiment, executable instructions 240 on each networked tablet permit the networked tablet to exchange data (such as stroke data) in peer-to-peer network comprised of a set of networked tablets. In an embodiment, one of the networked tablets may function as administrator on the peer-to-peer network.

3.4 Example Security Protocols

If desired, executable instructions 240 on a networked tablet may include security features and protocols sufficient to establish that a particular file represents (1) a completed display file, (2) annotated by a particular set of users, (3) during one or more specified time intervals, (4) (and optionally) while at particular physical locations.

For example, actions originating at each networked tablet may be recorded in a way to establish their occurrence at a certain time and/or place. Stroke data may be stored in a file, with a cryptographic hash value calculated for the file, with the resulting file and hash data stored by a reputable third-party.

In an embodiment, executable instructions 240 on a networked tablet include instructions to save stroke data as an XML file. In an embodiment, executable instructions 240 on a networked tablet include instructions to calculate a cryptographic hash value using the MD5 or SHA1 algorithms.

Similarly, verification that a particular networked tablet was used to create the completed display file may be accomplished by encoding the stroke data for the networked tablet with a cryptographic hash of a unique device identification code for the networked tablet, plus a small disclosed random string. Verification that a particular individual annotated a completed display file may be accomplished through comparison of the stroke data to other captured signatures known to be made by the individual.

Other techniques may be implemented to provide supplementary information used to establish the veracity of a completed display file. Examples of supplementary information include: (1) MAC hardware addresses of the local wireless access points used by the networked tablets; (2) location information of the networked tablets, provided using global positioning system (GPS) location data, or using the local wireless access points; and (3) route traces from the networked tablet's network connection to a known server.

4. Implementation Example—Host Computer Hardware Overview

Figure 6:
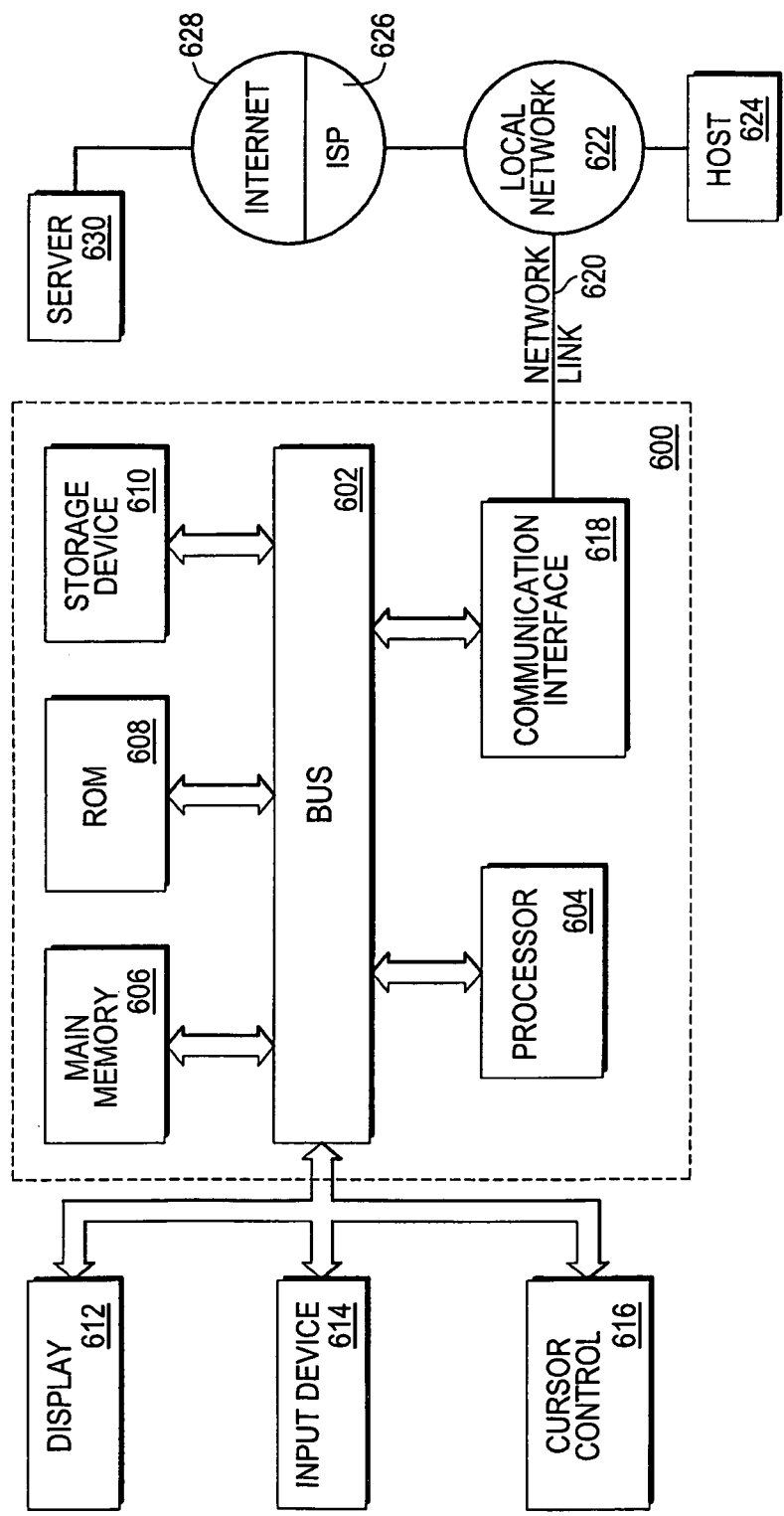
FIG. 6 illustrates a computer system on which embodiments may be implemented.

The approach described herein for simple annotations on personal computers may be implemented on any type of computing platform or architecture. To illustrate an example, FIG. 6 is a block diagram that depicts an example computer system 600 upon which embodiments of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, or permanent writeable memory such as a flash-ROM-based device, is provided and coupled to bus 602 for storing information and instructions.

Computer system 600 may be coupled using a bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 600, various computer-readable media are involved, for example, in providing instructions to processor 604 for execution. Such a medium may take many forms, including but not limited to, tangible data storage media such as non-volatile media and volatile media. Non-volatile media includes, for example, optical or magnetic disks, such as storage device 610. Volatile media includes dynamic memory, such as main memory 606. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read. For example, a computer-readable media includes a flash-memory based device, such as a USB-thumb drive or other mass-storage-class devices.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to another host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving, from a host computer, at a tablet computer, image data that represents a user-selected portion of an electronic document that is displayed on a display of the host computer, wherein the image data is in a first format and the electronic document is in a second format that is different than the first format, wherein the user-selected portion is less than the entirety of the electronic document;
   in response to receiving the image data from the host computer and without storing the electronic document on the tablet computer, displaying the image data on a stroke-sensitive display of the tablet computer;
   receiving, at the tablet computer, user input from the stroke-sensitive display;
   storing, in a memory of the tablet computer, a data file that includes the user input and the image data that represents, of the electronic document, only the user-selected portion.

2. The computer-implemented method of claim 1, further comprising the tablet computer detecting connection of the tablet computer to the host computer and uploading a host computer module from the tablet computer to the host computer, wherein the host computer module is configured to obtain user input selecting the electronic document, to receive one or more stroke events representing the handwritten strokes, and to update the electronic document at the host computer based on the stroke events.

3. The computer-implemented method of claim 1, further comprising the tablet computer detecting connection of the tablet computer to the host computer and uploading a host computer module from the tablet computer to the host computer, wherein the host computer module is configured to obtain user input selecting the electronic document from among a plurality of electronic documents stored on the tablet computer, to receive one or more stroke events representing the handwritten strokes, and to update the electronic document at the tablet computer based on the stroke events.

4. The computer-implemented method of claim 1, wherein the host computer detects connection of the tablet computer to the host computer, and in response, the host computer executes driver logic associated with a device type of the tablet computer, wherein the driver logic is configured to obtain user input selecting the electronic document, to receive one or more stroke events representing the handwritten strokes, and to update the electronic document at the host computer based on the stroke events.

5. The computer-implemented method of claim 1, further comprising the tablet computer detecting connection of the tablet computer to the host computer and downloading a host computer module from the tablet computer to the host computer, wherein the host computer module is configured to obtain user input selecting the electronic document from among a plurality of electronic documents that are stored in an external storage system and referenced in a filesystem of the tablet computer, to load the electronic document from the external storage system into temporary storage of the host computer, to receive one or more stroke events representing the handwritten strokes, and to update the electronic document on the external storage system based on the stroke events.

6. The computer-implemented method of claim 1, further comprising the tablet computer receiving the user input after the tablet computer detects disconnection of the tablet computer from the host computer.

7. The computer-implemented method of claim 1, further comprising the tablet computer receiving and buffering the user input after the tablet computer detects disconnection of the tablet computer from the host computer; the tablet computer detecting reconnection of the tablet computer to the host computer; and the tablet computer communicating the user input to the host computer in response to detecting the reconnecting.

8. The computer-implemented method of claim 1, wherein the image data represents a portion of the electronic document for a signature, and wherein the user input represents a handwritten signature applied to the stroke-sensitive display.

9. The computer-implemented method of claim 1, wherein the user input represents one or more annotations to the electronic document.

10. The computer-implemented method of claim 1, wherein the displaying comprises displaying, on the stroke-sensitive display of the tablet computer, only the image data representing the user-selected portion of the electronic document, and not all of a graphical display of the host computer.

11. The computer-implemented method of claim 1, wherein the displaying comprises displaying, in all available display area of the stroke-sensitive display of the tablet computer, only the image data representing the user-selected portion of a graphical display.

12. A data processing system, comprising:
a central processing unit;
a stroke-sensitive display coupled to the central processing unit;
a host computer interface coupled to the central processing unit and configured to couple to a host computer;
logic coupled to the central processing unit for execution by the central processing unit and configured to cause the central processing unit to perform:
receiving, while coupled to the host computer, from the host computer, image data that represents a user-selected portion of an electronic document that is displayed on a display of the host computer, wherein the image data is in a first format and the electronic document is in a second format that is different than the first format, wherein the user-selected portion is less than the entirety of the electronic document;
in response to receiving the image data from the host computer and without storing the electronic document on the tablet computer, displaying the image data on the stroke-sensitive display;
while displaying the image data on the stroke-sensitive display, receiving user input from the stroke-sensitive display;
storing, in a memory, a data file that includes the user input and the image data that represents, of the electronic document, only the user-selected portion.

13. The data processing system of claim 12, further comprising logic which when executed causes the tablet computer detecting connection of the tablet computer to the host computer and uploading a host computer module from the tablet computer to the host computer, wherein the host computer module is configured to obtain user input selecting the electronic document, to receive one or more stroke events representing the handwritten strokes, and to update the electronic document at the host computer based on the stroke events.

14. The data processing system of claim 12, further comprising logic which when executed causes the tablet computer detecting connection of the tablet computer to the host computer and uploading a host computer module from the tablet computer to the host computer, wherein the host computer module is configured to obtain user input selecting the electronic document from among a plurality of electronic documents stored on the tablet computer, to receive one or more stroke events representing the handwritten strokes, and to update the electronic document at the tablet computer based on the stroke events.

15. The data processing system of claim 12, wherein the host computer detects connection of the tablet computer to the host computer, and in response, the host computer executes driver logic associated with a device type of the tablet computer, wherein the driver logic is configured to obtain user input selecting the electronic document, to receive one or more stroke events representing the handwritten strokes, and to update the electronic document at the host computer based on the stroke events.

16. The data processing system of claim 12, further comprising logic which when executed causes the tablet computer detecting connection of the tablet computer to the host computer and downloading a host computer module from the tablet computer to the host computer, wherein the host computer module is configured to obtain user input selecting the electronic document from among a plurality of electronic documents that are stored in an external storage system and referenced in a filesystem of the tablet computer, to load the electronic document from the external storage system into temporary storage of the host computer, to receive one or more stroke events representing the handwritten strokes, and to update the electronic document on the external storage system based on the stroke events.

17. The data processing system of claim 12, further comprising logic which when executed causes the tablet computer receiving the user input after the tablet computer detects disconnection of the tablet computer from the host computer.

18. The data processing system of claim 12, further comprising logic which when executed causes the tablet computer receiving and buffering the user input after the tablet computer detects disconnection of the tablet computer from the host computer; the tablet computer detecting reconnection of the tablet computer to the host computer; and the tablet computer communicating the user input to the host computer in response to detecting the reconnecting.

19. The data processing system of claim 12, wherein the image data represents a portion of the electronic document for a signature, and wherein the user input represents a handwritten signature applied to the stroke-sensitive display.

20. The data processing system of claim 12, wherein the user input represents one or more annotations to the electronic document.

21. The data processing system of claim 12, wherein the displaying comprises displaying, on the stroke-sensitive display of the tablet computer, only the image data representing the user-selected portion of the electronic document, and not all of a graphical display of the host computer.

* * * * *